US012555433B2

(12) United States Patent
Gibson

(10) Patent No.: US 12,555,433 B2
(45) Date of Patent: Feb. 17, 2026

(54) INTEGRATED DISPLAY DEVICE AND AUDIO SPEAKER

(71) Applicant: Everi Games Inc., Austin, TX (US)

(72) Inventor: Daniel Gibson, Austin, TX (US)

(73) Assignee: Everi Games Inc., Austin, TX (US)

( * ) Notice: Subject to any disclaimer, the term of this patent is extended or adjusted under 35 U.S.C. 154(b) by 255 days.

(21) Appl. No.: 18/527,309

(22) Filed: Dec. 3, 2023

(65) Prior Publication Data

US 2025/0118132 A1 Apr. 10, 2025

Related U.S. Application Data

(60) Provisional application No. 63/542,934, filed on Oct. 6, 2023.

(51) Int. Cl.
*G07F 17/34* (2006.01)
*G07F 17/32* (2006.01)

(52) U.S. Cl.
CPC .......... *G07F 17/3211* (2013.01); *G07F 17/34* (2013.01)

(58) Field of Classification Search
CPC ............................ G07F 17/34; G07F 17/3211
See application file for complete search history.

(56) References Cited

U.S. PATENT DOCUMENTS

2008/0242411 A1* 10/2008 Connelly ................ G07F 17/32 463/20
2010/0151945 A2* 6/2010 Booney ............... G07F 17/3227 463/35
2020/0045421 A1* 2/2020 Keilwert .................. H04R 5/02
2020/0111301 A1* 4/2020 Wasinger ............ G07F 17/3267

FOREIGN PATENT DOCUMENTS

WO 2008030781 A2 3/2008

OTHER PUBLICATIONS

Aristocrat's MarsX™ landing in Europe news release, Aristocrat Leisure Limited, https://ir.aristocrat.com/node/10641/pdf.

* cited by examiner

*Primary Examiner* — David L Lewis
*Assistant Examiner* — Shauna-Kay Hall
(74) *Attorney, Agent, or Firm* — Calvert Technology Law, PLLC; Nathan H. Calvert

(57) ABSTRACT

A display assembly includes a display assembly housing, a display device, a front cover, and a first audio speaker assembly. The front cover is secured over an opening to a display assembly housing volume defined by the display assembly housing. The display device is mounted within the display assembly housing volume and defines a display device area aligning with a first area of the front cover. The display assembly further includes a first speaker opening in the front cover. The first speaker opening is defined by a first speaker opening peripheral edge that lies entirely within the front cover area so that the first speaker opening is spaced apart from the front cover peripheral edge. The first audio speaker assembly is mounted within the display assembly housing volume so that a sound output area of the first audio speaker assembly aligns with the first speaker opening in the front cover.

20 Claims, 6 Drawing Sheets

INTEGRATED DISPLAY DEVICE AND AUDIO SPEAKER

CROSS-REFERENCE TO RELATED APPLICATION

Applicant claims the benefit, under 35 U.S.C. § 119(e), of U.S. Provisional Patent Application No. 63/542,934 filed Oct. 6, 2023, and entitled "Integrated Display Device and Audio speaker." The entire content of this provisional application is incorporated herein by this reference.

TECHNICAL FIELD OF THE INVENTION

The invention relates to display devices such as video display monitors used to display various graphic elements associated with a game available for play through a gaming machine. More particularly, the invention relates to devices that integrate one or more audio speakers with a display device.

BACKGROUND OF THE INVENTION

The sound quality of audio generated during the course of play at a gaming machine such as a video or mechanical reel-type game (commonly referred to as a "slot machine") has become an important aspect of the overall playing experience. Thus modern gaming machines commonly include sophisticated audio amplifiers connected to drive various audio speakers in the course of play. The placement of audio speakers for maximum audio performance without interfering with the various display devices included in a gaming machine can become an issue particularly in gaming machines that include display devices located over a large area of the front-facing surfaces. In some cases, tall video display devices arranged in a portrait orientation may cover virtually all of the front area of a gaming machine above the button deck of the gaming machine. In other cases, a number of relatively smaller video display devices may be arranged on a gaming machine cabinet to cover most if not all of the front area of a gaming machine above the button deck of the gaming machine. The display devices included in a gaming machine may also include mechanical devices such as spinnable reels or wheels that are located behind a transparent or selectively light transmissive front cover. All of these display arrangements in a gaming machine may leave little room above the gaming machine button deck for forward facing audio speakers.

SUMMARY OF THE INVENTION

It is an object of the invention to provide a display assembly that integrates one or more audio speakers with one or more display devices. Another object of the invention is to provide a gaming machine including one or more display assemblies including an integrated audio speaker or multiple integrated speakers.

Display assemblies according to a first aspect of the present invention include a display assembly housing, a display device, a front cover, and an audio speaker assembly. The front cover has a front cover peripheral edge that defines a front cover area and is secured over a display assembly housing front opening. This display assembly housing front opening represents an opening to a display assembly housing volume defined by the display assembly housing. The display device, which may be an LCD video monitor or similar device, is mounted within the display assembly housing volume and defines a display device area aligning with a first area of the front cover. Display assemblies according to this first aspect of the invention further include a speaker opening in the front cover. The speaker opening is defined by a speaker opening peripheral edge that lies entirely within the front cover area so that the speaker opening is spaced apart from the front cover peripheral edge. The audio speaker assembly is mounted within the display assembly housing volume so that a sound output area of the audio speaker assembly aligns with the speaker opening in the front cover.

A second aspect of the invention encompasses gaming machines that include a display assembly in accordance with the first aspect of the invention.

In some implementations according to either the first or second aspect of the invention, the display assembly may also include an accent lighting strip mounted within the display assembly housing volume so that an area of the accent lighting strip aligns with a boarder accent light area of the front cover adjacent to a portion of the front cover peripheral edge. In these implementations, the speaker opening may be located between the first area of the front cover and the boarder accent light area of the front cover.

The audio speaker assembly in some embodiments of the display assembly may include an elongated speaker enclosure located within the display assembly housing volume so as to extend along an edge of the display device area. Of course, some embodiments may include at least one additional speaker opening in the front cover similarly spaced apart from the front cover peripheral edge, and with an additional audio speaker assembly similarly mounted within the display assembly housing volume with respect to the additional speaker opening. Two or perhaps more speaker assemblies may be mounted in the display assembly housing volume so that the longitudinal axes of the elongated speaker enclosures align, at least in plan view from the front of the display assembly.

The front cover in a display assembly according to either the first or second aspects described above may include a transparent layer that extends throughout the front cover area aside from the first speaker opening. For example, the front cover may comprise a glass or acrylic panel shaped so that the panel peripheral edge aligns with the display assembly housing front opening. Where the front cover includes a transparent layer that extends throughout the front cover area, an opaque covering may surround each speaker opening and also align with an area defined by the respective elongated (or other shaped) speaker enclosure so that the speaker enclosure is not visible through the front cover from the front of the display assembly.

These and other aspects, advantages, and features of the invention will be apparent from the following description of representative embodiments, considered along with the accompanying drawings.

DESCRIPTION OF REPRESENTATIVE EMBODIMENTS

Figure 1:
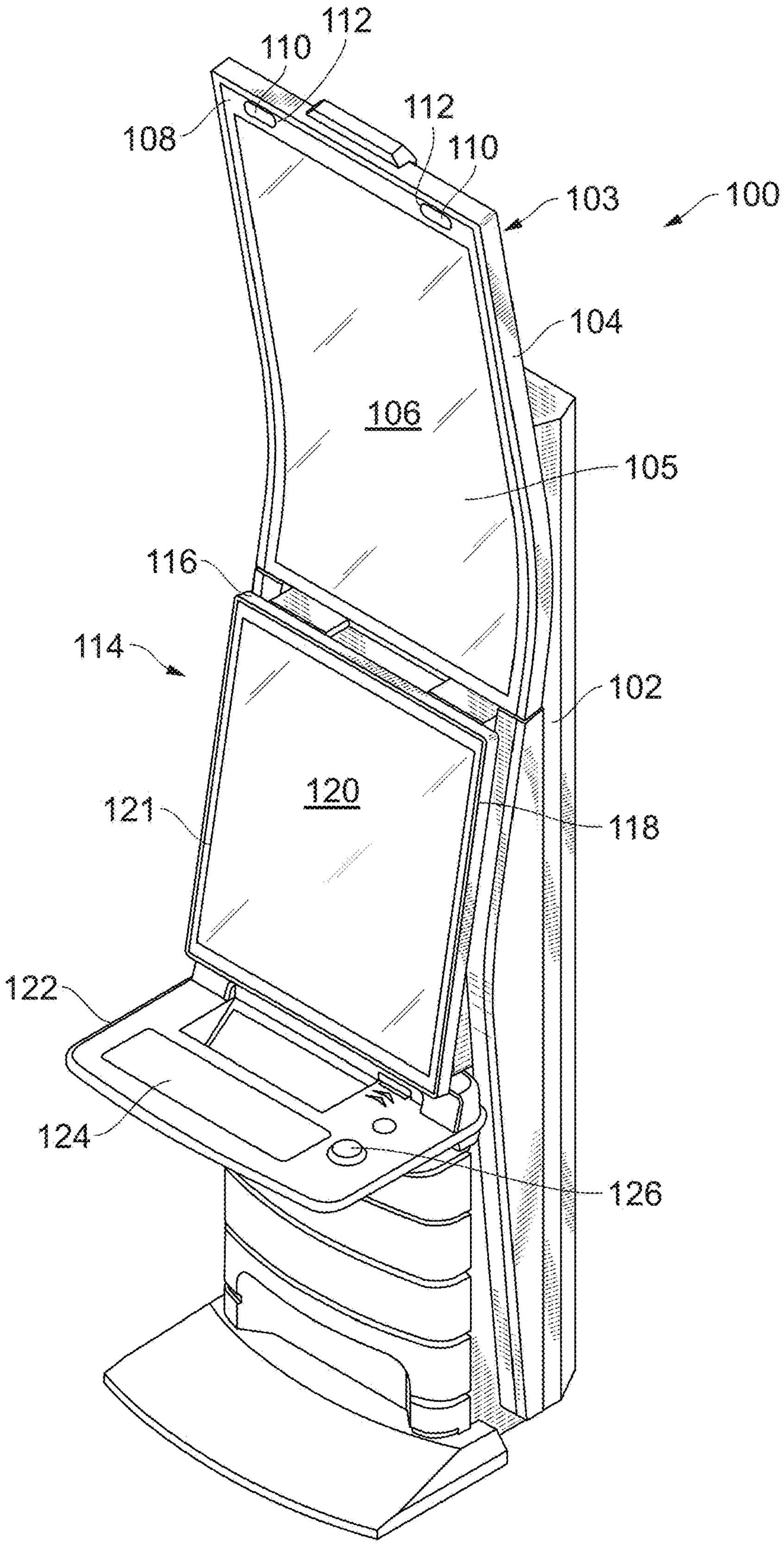
FIG. 1 is an isometric view of a gaming machine in accordance with an embodiment of the present invention.

Referring to FIG. 1, an example gaming machine 100 includes a cabinet 102 on which is mounted a display assembly 103 having integrated audio speakers in accordance with an embodiment of the present invention. Display assembly has a display assembly housing 104 with a front cover 105 secured in an operating position. As will be described further below, display assembly housing 104 houses a display device having a display device area aligning with an area 106 of front cover 105. The illustrated front cover 105 includes an opaque covering area 108 providing a boarder around first transparent area 106. Two oval-shaped speaker grilles 110 are mounted in oval speaker openings 112 in front cover 105 (the openings 112 each being defined by an oval-shaped peripheral edge). Example gaming machine 100 also includes a lower display assembly 114 mounted on cabinet 102 below display assembly 103. Lower display assembly 114 includes a lower display assembly housing 116 in which is mounted a lower display device. This lower display device, which is obscured in the view of FIG. 1 behind a lower display housing front cover 118, is aligned in lower display assembly housing 116 so that a display area of the lower display device aligns with a transparent area 120 of front cover 118, this area 120 being bounded by a border area 121. Example gaming machine 100 further includes a player control deck 122 extending forwardly below lower display assembly 114. This example player control deck 122, which may also be referred to as a "button deck," includes a player control touchscreen video display device 124 together with a mechanical "play" button 126.

Although lower display assembly 114 in this example gaming machine is not shown as including an integrated audio speaker in accordance with the present invention, other gaming machines may include a display assembly in accordance with aspects of the present invention in the position of lower display assembly 114. This may be in lieu of or in addition to the display assembly 103 with integrated audio speakers. More generally, a display assembly with one or more integrated audio speakers may be included at essentially any position on a gaming machine within the scope of the present invention.

Figure 2:
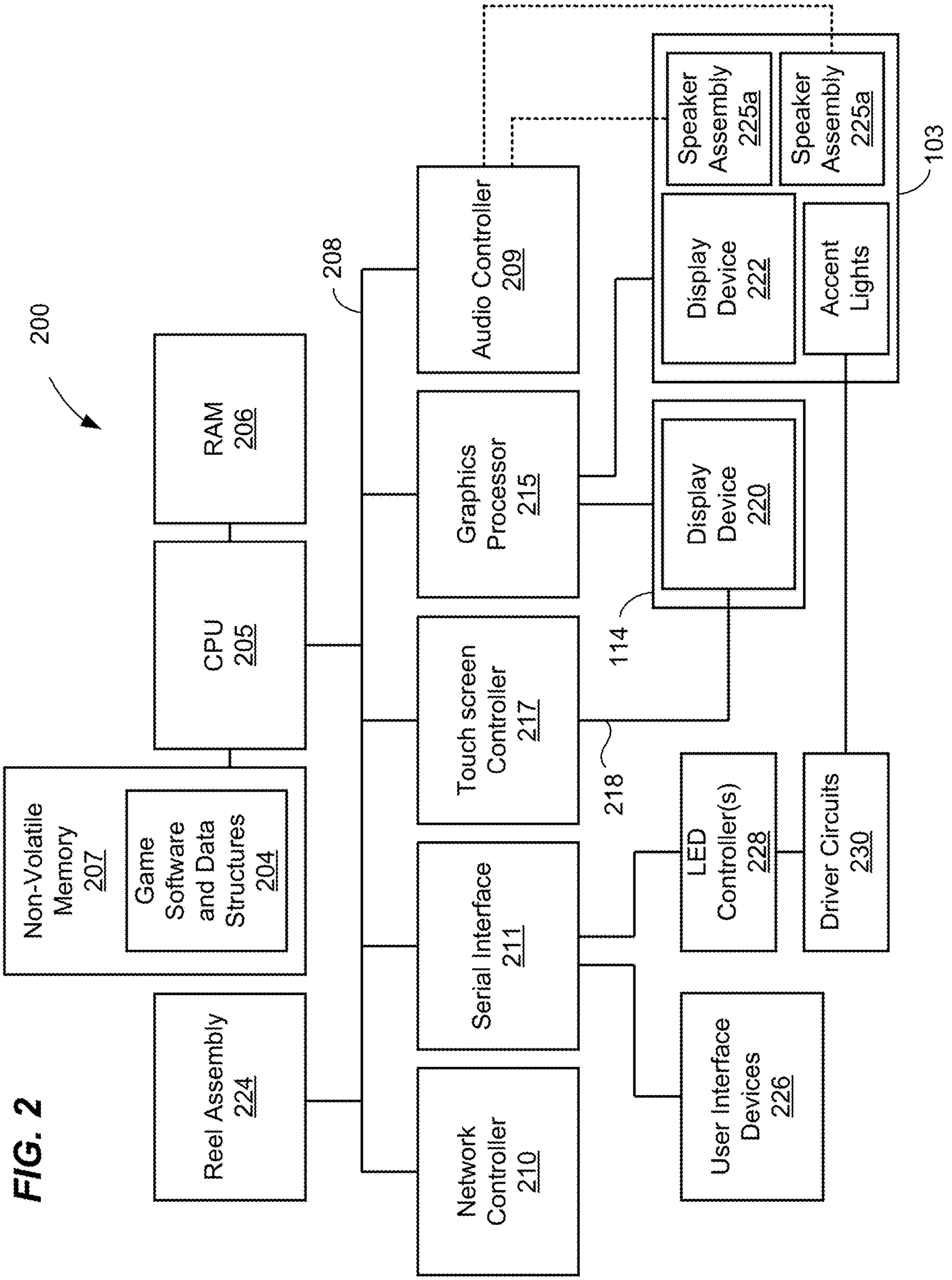
FIG. 2 is a block diagram showing the various components that may be included in the gaming machine shown in FIG. 1.

FIG. 2 shows a logical and hardware block diagram 200 of gaming machine 100 that includes a processor (CPU) 205 along with a suitable connection to random access memory (RAM) 206 and a suitable connection to non-volatile memory 207. CPU 205 is connected on a system bus 208 with an audio controller device 209, a network controller 210, a serial interface 211, a graphics processor 215, and a touch screen controller 217. Graphics processor 215, or another graphics processor included in the gaming machine but not shown in this diagram, may provide a suitable video output to a video display device 220 mounted in display assembly 114 and a video display device 222 mounted in display assembly 103. Video display device 222 in this example comprises the video display device, such as an LCD or OLED display monitor for example, having a display device area aligning with area 106 of display assembly 103 in FIG. 1, while video display device 220 comprises the video display device (for example, an LCD or OLED display monitor) having a display device area aligning with lower display assembly front cover area 120 in FIG. 1. In the example of FIG. 2, display device 220 is shown as a touchscreen display device having a touch screen element connected via signal path 218 to touch screen controller 217. It will be appreciated that the touch screen element itself may comprise a thin film element on or associated with display area 120 and is not shown separately in these views. Touch screen controller 217 may also be connected via a suitable signal path (not shown) to receive signals from a touch screen element (not shown) associated with video display device 124 mounted on the player control deck 122 in this example.

Those familiar with data processing devices and systems will appreciate that other basic electronic components will be included in gaming machine 100 such as a power supply, cooling systems for the various system components, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer, although they may be specially designed and configured for use in a gaming environment. These elements may be mounted on one or more circuit boards housed within cabinet 102 with or without a separate enclosure. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211 (a USB controller for example). Also, each touch screen may include a dedicated touch screen controller. It will also be appreciated that some of the devices shown in FIG. 2 as being connected directly on system bus 208 may in fact communicate with the other system components through a suitable expansion bus. Where such a controller is included in a gaming machine in accordance with the present invention, audio controller 209, for example, may be connected to the system via a PCI or PCIe bus or bus configured according to some other expansion bus standard. System bus 208 is shown in FIG. 2 merely to indicate that the various components are connected in some fashion for communication with CPU 205 and is not intended to limit the invention to any particular bus architecture.

Numerous other variations in the gaming machine internal structure and system may be used without departing from the principles of the present invention. For example, a gaming machine in some embodiments of the present invention may rely on one or more data processors located remotely from the gaming machine itself. Embodiments of the present invention may include no processor such as CPU 205 or graphics processor such as 215 at the gaming machine and may instead rely on one or more remote processors. Thus unless specifically stated otherwise, the designation "gaming machine" is used in this disclosure and the accompanying claims to designate a system of devices that operate together to provide the indicated functions. A "gaming machine" may include a gaming machine such as gaming machine 100 shown in FIGS. 1 and 2, that is itself a system of various components, and may also include one or more components remote from a gaming machine cabinet (that is, remote from the cabinet 102 of gaming machine 100 in FIG. 1). As used herein, the designation "gaming machine" encompasses both a stand-alone gaming machine and a gaming machine along with one or more remote components for providing various functions (such as identifying prizes for a given play and controlling result display graphics and performing other operations).

It will also be appreciated that graphics processors are also commonly a part of modern computer systems. Although separate graphics processor 215 is shown for controlling display devices 220 and 222, CPU 205 or a graphics processor packaged with or included with CPU 205 may control all of the display devices directly without any separately packaged graphics processor. The invention is not limited to any particular arrangement of processing devices for controlling the display devices included with gaming machine 100, including the display device included with a display assembly in accordance with the present invention. Also, a gaming machine implementing the present invention is not limited to any particular number of video display devices or any particular types of display devices. Also, the display device areas 106 and 120 in FIG. 1 may be arranged differently than the portrait orientation shown. A display area such as area 106 may also be aligned with multiple individual display devices within housing 104 that together provide the desired graphic images within the display area.

Control of display devices 220 and 222 will include a suitable driving signal for driving the respective display. Such a driving signal may include any video signal format or standard that the respective display device is adapted to receive. For example, a DisplayPort, HDMI, or DVI signal may be used to drive a respective one of the displays to provide the desired images. Of course, each display will commonly receive operating power separately from the display driving signal. The above-noted video standards also incorporate digital audio signals for driving audio speakers such as speakers associated with audio speaker assemblies 225*a* and 225*b* included with display assembly 103. Alternatively to providing an audio input for audio speaker assemblies 225*a* and 225*b* through a DisplayPort, HDMI, or DVI signal for example, the signals for driving audio speaker assemblies 225*a* and 225*b* associated with display assembly 103 may be provided directly from audio controller 209 via a suitable connection not shown in FIG. 2 in dashed lines. Signal processing and amplification for the audio signals provided to drive audio speaker assemblies 225*a* and 225*b* in the example of FIG. 2, may be provided in any suitable fashion. For example, each audio speaker assembly 225*a* and 225*b* may include a suitable digital to analog converter for producing an analog audio signal from the digital audio information provided from the signal communicated from graphics processor 215. Alternatively, a two-channel audio amplifier may be used to convert the digital audio to analog and provide the desired amplification. In cases where audio controller 209 provides signal processing for the audio signals used to drive speaker assemblies 225*a* and 225*b*, digital to analog conversion may be performed by audio controller 209 and amplification may be provided by the audio controller as well or with amplifiers incorporated with the speaker assemblies or separate from the speaker assemblies.

In the illustrated gaming machine 100, CPU 205 executes software, that is, program code represented at 204 in the figure, that ultimately controls the entire gaming machine including the receipt of player inputs and the presentation of the graphics or information displayed through the display devices 220 and 222 and any other display devices associated with the gaming machine. This program code may include various data structures defining various assets (such as graphics assets for example) employed in the course of presenting the given game at gaming machine 100. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise mass storage device providing storage for game software (program code) prior to loading into random access memory 206 for execution, or for programs and program assets not in use or for other data generated or used in the course of gaming machine operation. Network controller 210 provides an interface to other components of a gaming system in which gaming machine 100 may be included.

It should be noted that the invention is not limited to gaming machines employing the specially configured general purpose processing devices and personal computer-type arrangement of processing devices and interfaces shown in example gaming machine 100. Other gaming machines through which the invention may be implemented may include one or more special purpose processing devices to perform the various processing steps for implementing the invention.

FIG. 2 shows a reel assembly 224 for mechanical reels that may be mounted on gaming machine 100. For example, mechanical reels may be mounted in gaming machine cabinet 102 behind a portion of display area 120 in FIG. 1 where the corresponding display device 220 is configured as a transmissive display. Alternatively, a mechanical reel arrangement may replace all or part of lower display assembly 114 in the example of FIG. 1. It is also possible within the scope of the invention to include a mechanical reel display system in lieu of a display device such as display device 222 or in addition to display device 222. Although the invention is not limited to any particular mechanical reel arrangement or control system, mechanical reels may be controlled conveniently through serial communications to a reel controller that provides instructions for a respective stepper motor for each reel. Thus some embodiments of the present invention that employ mechanical reels may use a serial interface device such as serial interface 211 to control communications with the reel assembly and may not include a direct bus interconnection as indicated by FIG. 2. Furthermore, a gaming machine including a display assembly with an integrated audio speaker in accordance with the present invention need not include any mechanical reels or other mechanical spinning elements.

The example gaming machine 100 is shown in FIG. 2 as including user interface devices 226 (part of a player input system) connected to serial interface 211. These user interface devices may include various player input devices such as "play" button 126 in FIG. 1 and other mechanical buttons, virtual buttons shown on touchscreen button panel 124 in FIG. 1, and/or levers, and other devices. It will be appreciated that the interface between CPU 205 and other player input devices such as player card readers, voucher readers or printers, and other devices may be in the form of serial communications. Thus serial interface 211 may be used for those additional devices as well, or the gaming machine may include one or more additional serial interface controllers.

However, the interface between peripheral devices in the gaming machine, such as player input devices, is not limited to any particular type or standard for purposes of the present invention.

FIG. 2 shows that gaming machine 100 also has an accent light control system including LED controllers 228 connected for serial communications through serial interface 211. Each LED controller 228 is operatively connected to driver circuits 230 that are each connected to apply LED driving signals to a respective LED light associated with the accent lights associated with the display assembly 103. An example accent lighting arrangement associated with display assembly 103 will be described below in connection with FIGS. 5 and 6.

Figure 3:
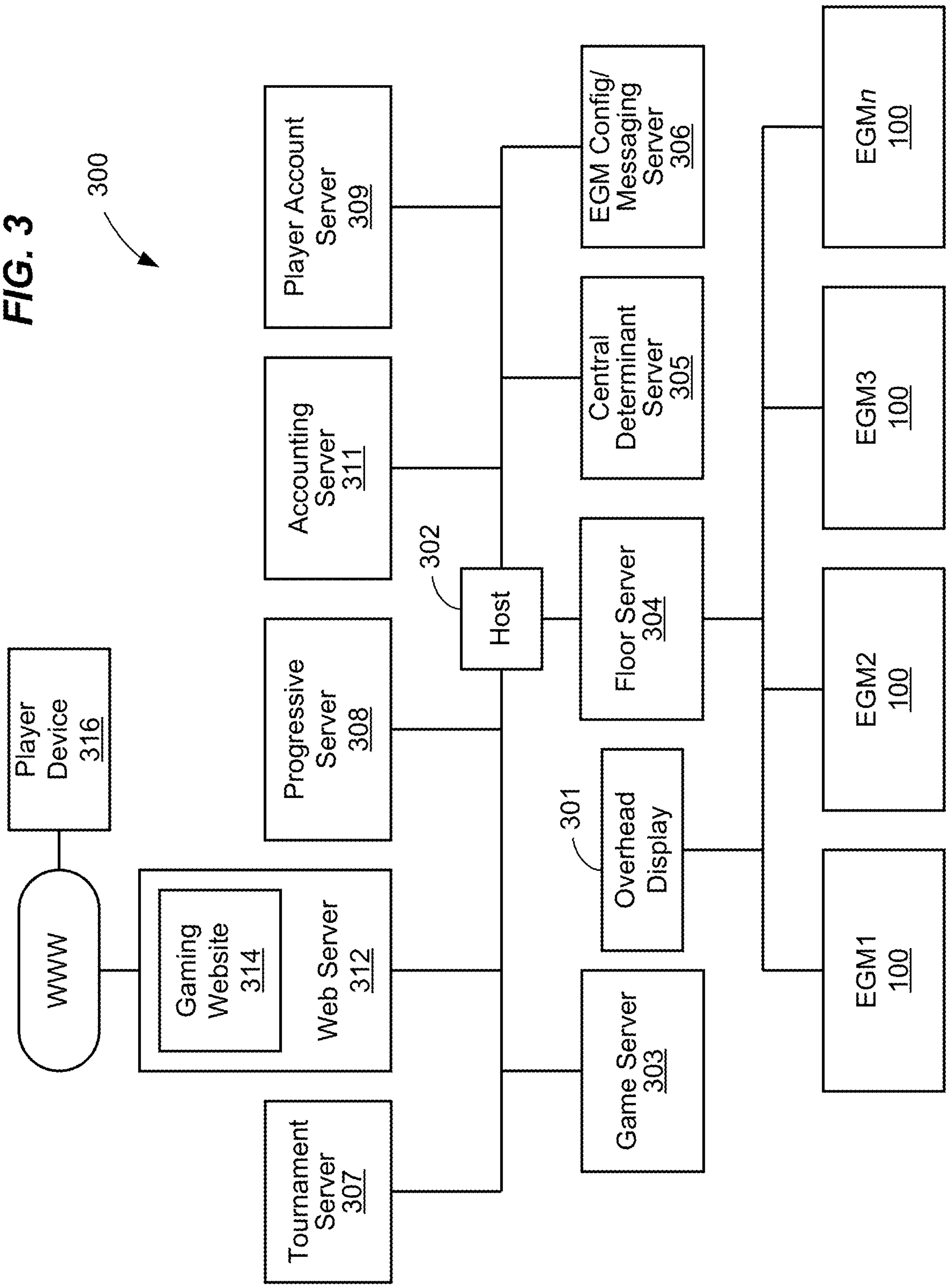
FIG. 3 is a block diagram of a gaming system including gaming machines such as that shown in FIG. 1.

Referring now to FIG. 3, a networked gaming system 300 associated with one or more gaming facilities may include one or more networked gaming machines 100 (shown in FIG. 3 as EGM1-EGMn) connected in the network by suitable network cable or wirelessly. Networked gaming machines 100 and one or more overhead display devices 301 may be operatively connected so that the overhead display device or display devices may mirror or replay the content of one or more displays of gaming machines 100. For example, the display content for a given gaming machine 100 (including a base game portion and/or bonus features) may be transmitted through network controller 210 to a controller associated with the overhead display device(s) 301. In the event gaming machines 100 have cameras installed, the respective player's video images may be displayed on overhead display device 301 along with the content of the player's gaming machine display.

The example gaming network 300 shown in FIG. 3 includes a host server 302 and floor server 304, that together may function as an intermediary between floor devices such as gaming machines 100 and back-office devices such as the various servers described below. Game server 303 may provide server-based games and/or game services to network connected gaming devices such as gaming machines 100. Central determinant server 305 may be included in the network to identify or select lottery, bingo, or other centrally determined game results and provide the result information to networked gaming machines 100 that present the games or game results to players.

EGM configuration and messaging server 306 may provide game and non-game content and operational software for use by the gaming machines 100 in the course of providing games and while the gaming machines are unused and in an idle state. For example, server 306 may control the distribution of game software and graphic control assets to the gaming machines as well as advertising messages and other messages that may be presented using a display device of a gaming machine 100.

Tournament server 307 may be included in the system for controlling or coordinating tournament functions. These functions may include maintaining tournament player scores and ranking during the course of tournament play and communicating this information to the various gaming machines 100 participating in the tournament. Tournament server 307 may also function to enroll players in tournaments, schedule tournaments, and maintain the time remaining in the various tournaments.

Progressive server 308 may maintain progressive pools for progressive games that may be available through the various gaming machines 100. In some implementations, progressive server 308 may simply receive communications indicating contribution amounts that have been determined by processes executing at the various gaming machines 100 or elsewhere in the gaming network. Alternatively, progressive server 308 may perform processes to determine the contribution amounts for incrementing the various progressive pools that may be maintained. Progressive server 308 may also periodically communicate current pool values back to the various gaming machines 100 and may participate in communicating awarded progressive prize amounts to the gaming machines and in adjusting the progressive prize pools accordingly. In some implementations, progressive server 308 may also determine or participate in determining when a progressive prize triggering event occurs.

Accounting server 311 may receive gaming data from each of the networked gaming devices, perform audit functions, and provide data for analytical programs. Player account server 309 may maintain player account records, and store persistent player data such as accumulated player points and/or player preferences (for example, game personalizing selections or options).

Example gaming network 300 also includes a gaming website 314 that may be hosted through web server 312 and may be accessible by players via the Internet. One or more games may be displayed and played by a player through a player device 316 such as a wired or wireless personal computer or handheld wireless device (for example, an Android® operating system smart phone, Apple® iPhone® smart phone, personal digital assistant (PDA), iPad® or other tablet computer, etc.). To enter website 314, a player may log in with a user name that may, for example, be associated with the player's account information stored on player account server 309. Once logged in to website 314 the player may play various games on the website. Also, website 314 may allow the player to make various personalizing selections and save the information so it is available for use during the player's next gaming session at a casino establishment having the gaming machines 100.

Gaming network 300 illustrated in FIG. 3 is provided merely as an example of a gaming network that may include gaming machines with display assemblies according to aspects of the present invention and is not intended to be limiting in any way. Gaming machines having one or more display assemblies with integrated audio speakers according to aspects of the present invention are not limited to use with gaming networks such as network 300.

Figure 4:
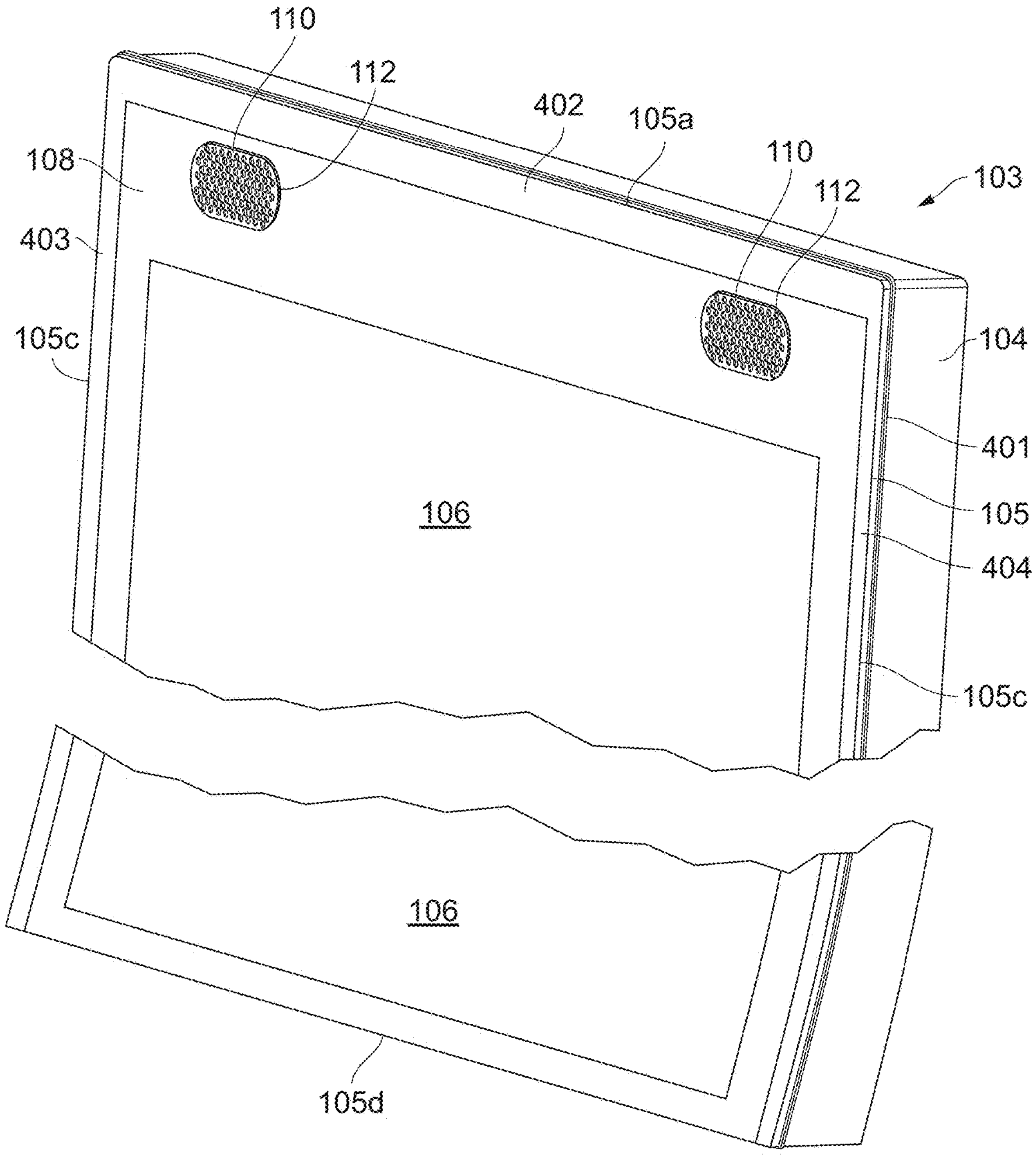
FIG. 4 is an enlarged, partially broken away isometric view of display assembly 103 in FIG. 1.

FIG. 4 shows and enlarged view of portions of display assembly 103. This enlarged view shows that front cover 105 has a front cover area defined by peripheral edges 105*a*, 105*b*, 105*c*, and 105*d*. In addition to front cover 105, this enlarged view shows a diffuser layer 401. The purpose of the diffuser layer 401 will be described further below with reference to an accent lighting arrangement included in display assembly 103. However here it should be noted that diffuser layer 401 does not extend across the entire area of front cover 105. Rather, diffuser 401 extends at least in an area corresponding with peripheral areas 402, 403, and 404 in FIG. 4. These areas 402, 403, and 404 lie outside of area 108 and include transparent portions of front cover 105. The opaque covering area 108 provides a border around the central transparent area 106 of front cover 105 with the transparent areas 402, 403, and 404 extending along the top, left, and right sides, respectively, of the front surface of display assembly 103. Opaque covering area 108 may be formed by an opaque coating such as a screen-printed coating in a suitable color such as black or may comprise a layer of opaque material secured to the front surface of front cover 105.

Figure 5:
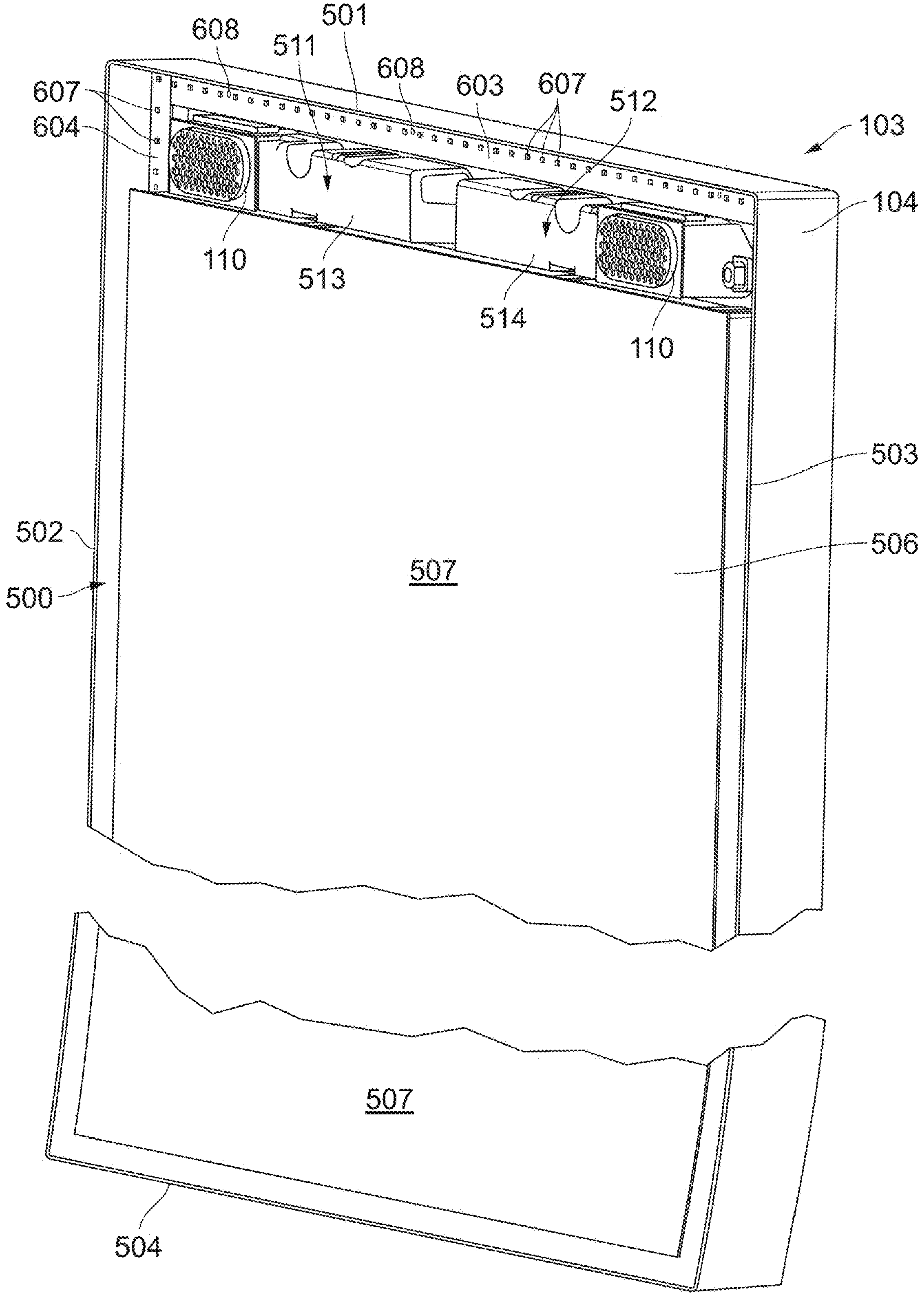
FIG. 5 is an enlarged isometric view similar to FIG. 4 but with the front cover and a diffuser layer removed from the front of the display assembly housing.
Figure 6:
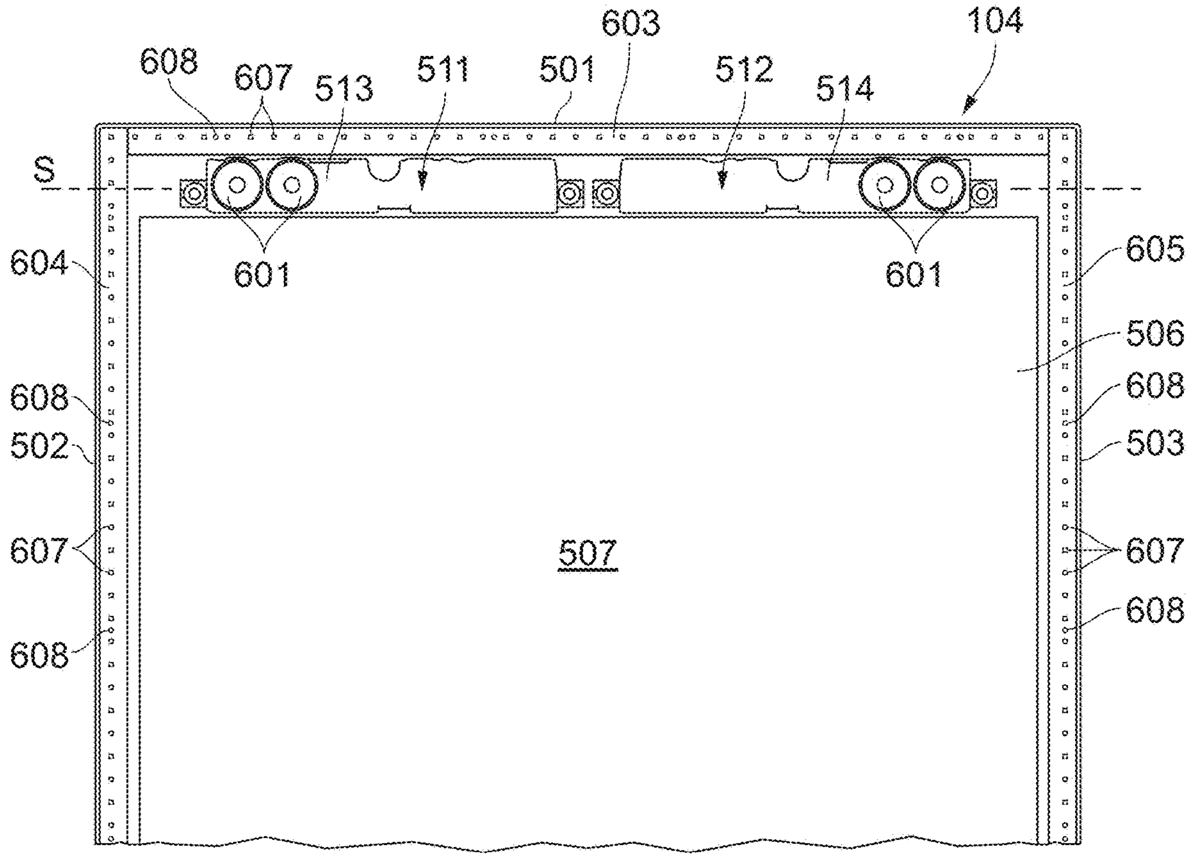
FIG. 6 is a truncated front view showing the top portion of the display assembly components shown in FIG. 5.

FIGS. 5 and 6 show display assembly 103 with the front cover 105 and diffuser 401 removed to expose a front opening 500 of display assembly housing 104. Opening 500 is defined by a top edge 501, left edge 502, right edge 503, and bottom edge 504. With front opening 500 exposed, FIGS. 5 and 6 show display device 222 mounted within display assembly housing 104 and having a front surface 507. Display device 222 is positioned in housing 104 with the front surface 507 aligned with the area 106 (FIGS. 1 and 4) of display assembly 103 so that images formed on front surface 507 of display 222 are visible in area 106 in the course of gaming machine operation.

The views of FIGS. 5 and 6 also show speaker assemblies 225*a* and 225*b* mounted within housing 104. Speaker assembly 225*a* includes an elongated speaker enclosure 513 while speaker assembly 225*b* includes an elongated speaker enclosure 514. FIG. 6 also shows the speaker grills 110 removed to show speaker diaphragms 601. In this example, the respective speaker diaphragm 601 aligns with a sound output area of the respective speaker assembly. As best shown in FIG. 6, the elongated speaker enclosures 513 and 514 are mounted so that their longitudinal axes are aligned along line S which in this example extends substantially parallel to the top edge 501 of display assembly housing 104. Comparing FIG. 5 particularly with FIG. 4, the area in which speaker enclosures 513 and 514 are mounted within display assembly housing 104 aligns with the area covered by opaque covering area 108 when front cover 105 is secured in its operating position on display assembly housing 104. Thus although front cover 105 is itself transparent, opaque covering area 108 covers the area housing speaker enclosures 513 and 514 so that the speaker enclosures are not visible in operation of display assembly 103.

As shown best in FIG. 6, the example display assembly 103 includes an accent lighting arrangement mounted within display assembly housing 104. The example accent lighting arrangement is made up of LED strips 603 at the top, 604 at the left, and 605 at the right, each comprising an elongated printed circuit board in this example. Each of the LED strips 603, 604, and 605 includes a number of LEDs 607 and is mounted within display assembly housing 104 by fasteners 608 to align with the peripheral clear portions of front cover 105 comprising areas 403, 404, and 405 shown in FIG. 4. The LEDs 607 may be operated under control of controller 228 shown in FIG. 2 to provide accent lighting effects such as flashing in different colors, chasing effects, and other lighting effects around the periphery of display assembly 103. These lighting effects may be synchronized with events in the course of gameplay at gaming machine 100 (FIG. 1). The diffuser layer 401 referenced above in connection with FIG. 4 includes a layer of light diffusing material which extends under areas 403, 404, and 405 in FIG. 4 to diffuse the light emitted by LEDs 607 in operation of display assembly 103. Diffusion layer 401 also may prevent the individual LEDs 607 and the printed circuit boards on which they are mounted in this example from being visible from the front of the gaming machine through the clear areas 403, 404, and 405 in FIG. 4.

Numerous variations are possible in a display device assembly with one or more integrated audio speakers in accordance with the present invention. For example, although oval openings 112 are shown in FIGS. 1 and 4 for accepting oval speaker grills 110, other embodiments may not include oval-shaped openings to speaker arrangements. Also a display assembly in accordance with the present invention need not be rectangular as shown and need not have a J shape (in side view) as shown in the example display assembly 103. Display assemblies with one or more integrated audio speakers in accordance with the present invention also need not include accent lighting such as the LED strips 603, 604, and 605 shown in the present example. Also, although display assembly housing 104 is shown as essentially a separate housing from the gaming machine cabinet 102 (FIG. 1), other embodiments may incorporate a display and integrated audio speakers in accordance with the present invention in a housing comprising part of the gaming machine cabinet (such as cabinet 102 in FIG. 1). In such implementations, a portion of the gaming machine cabinet may comprise the housing for the display device or devices and speaker or speakers. A front cover with speaker openings in accordance with the present invention may be secured over a front opening of that portion of the gaming machine cabinet. Regardless of whether the display assembly housing is a separate housing such as display assembly housing 104 or part of the gaming machine cabinet itself, the speakers and front cover speaker openings need not be arranged to the periphery of a display device housed within the housing. Rather, the speaker openings such as openings 112 shown in FIGS. 1 and 4) may be at any location across the front area defined by the display assembly.

As used herein, whether in the above description or the following claims, the terms “comprising,” “including,” “carrying,” “having,” “containing,” “involving,” and the like are to be understood to be open-ended, that is, to mean including but not limited to. Also, it should be understood that the terms “about,” “substantially,” and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as “first,” “second,” “third,” etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as “top,” “bottom,” “upper,” “lower,” and the like are used with reference to the orientation of the figures unless specifically stated otherwise.

The term “each” may be used in the following claims for convenience in describing characteristics or features of multiple elements, and any such use of the term “each” is in the inclusive sense unless specifically stated otherwise. For example, if a claim defines two or more elements as “each” having a characteristic or feature, the use of the term “each” is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A display assembly including:

(a) a display assembly housing defining a display assembly housing volume with a display assembly housing front opening;

(b) a front cover secured in a front cover operating position over the display assembly housing front opening, the front cover having a front cover peripheral edge that defines a front cover area;

(c) a display device mounted within the display assembly housing volume, the display device defining a display device area aligning with a first area of the front cover;

(d) a first speaker opening in the front cover, the first speaker opening being defined by a first speaker opening peripheral edge that lies entirely within the front cover area so that the first speaker opening is spaced apart from the front cover peripheral edge; and (e) a first audio speaker assembly mounted within the display assembly housing volume, the first audio speaker assembly being mounted within the display assembly housing volume so that a sound output area of the first audio speaker assembly is aligned within the first speaker opening in the front cover.

2. The display assembly of claim 1 wherein the front cover includes a transparent layer that extends throughout the front cover area aside from the first speaker opening.

3. The display assembly of claim 1 further including an accent lighting strip mounted within the display assembly housing volume so that an area of the accent lighting strip aligns with a boarder accent light area of the front cover adjacent to a portion of the front cover peripheral edge.

4. The display assembly of claim 3 wherein the first speaker opening is located between the first area of the front cover and the boarder accent light area of the front cover.

5. The display assembly of claim 1 wherein the first audio speaker assembly includes an elongated first speaker enclosure located within the display assembly housing volume so as to extend along an edge of the display device area.

6. The display assembly of claim 5 further including an opaque covering surrounding the first speaker opening and covering an area of the front cover defined by the elongated first speaker enclosure.

7. The display assembly of claim 1 further including:

(a) a second speaker opening in the front cover, the second speaker opening being defined by a second speaker opening peripheral edge that lies entirely within the front cover area so that the second speaker opening is spaced apart from the front cover peripheral edge; and (b) a second audio speaker assembly mounted within the display assembly housing volume, the second audio speaker assembly being mounted within the display assembly housing volume so that a sound output area of the second audio speaker assembly aligns with the second speaker opening in the front cover.

8. The display assembly of claim 7 wherein:

(a) the first audio speaker assembly includes an elongated first speaker enclosure located within the display assembly housing volume so as to extend along an edge of the display device area; and (b) the second audio speaker assembly includes an elongated second speaker enclosure located within the display assembly housing volume so as to extend along an edge of the display device area.

9. The display assembly of claim 8 further including an opaque covering surrounding both the first speaker opening and the second speaker opening and covering an area of the front cover defined by an area of the elongated first speaker enclosure and an area of the elongated second speaker enclosure.

10. The display assembly of claim 9 wherein the longitudinal axis of the elongated first speaker enclosure aligns with the longitudinal axis of the elongated second speaker enclosure.

11. A gaming machine including:

(a) a gaming machine cabinet;

(b) a display assembly housing included on the gaming machine cabinet, the display assembly housing defining a display assembly housing volume with a display assembly housing front opening;

(b) a front cover secured in a front cover operating position over the display assembly housing front opening, the front cover having a front cover peripheral edge that defines a front cover area;

(c) a display device mounted within the display assembly housing volume, the display device defining a display device area aligning with a first area of the front cover;

(d) a first speaker opening in the front cover, the first speaker opening being defined by a first speaker opening peripheral edge that lies entirely within the front cover area so that the first speaker opening is spaced apart from the front cover peripheral edge; and (e) a first audio speaker assembly mounted within the display assembly housing volume, the first audio speaker assembly being mounted within the display assembly housing volume so that a sound output area of the first audio speaker assembly is aligned within the first speaker opening in the front cover.

12. The gaming machine of claim 11 wherein the front cover includes a transparent layer that extends throughout the front cover area aside from the first speaker opening.

13. The gaming machine of claim 11 further including an accent lighting strip mounted within the display assembly housing volume so that an area of the accent lighting strip aligns with a boarder accent light area of the front cover adjacent to a portion of the front cover peripheral edge.

14. The gaming machine of claim 13 wherein the first speaker opening is located between the first area of the front cover and the boarder accent light area of the front cover.

15. The gaming machine of claim 11 wherein the first speaker includes an elongated speaker enclosure located within the display assembly housing volume so as to extend along an edge of the display device area.

16. The gaming machine of claim 15 further including an opaque covering surrounding the first speaker opening and covering an area of the front cover defined by an area of the elongated speaker enclosure.

17. The gaming machine of claim 11 further including:

(a) a second speaker opening in the front cover, the second speaker opening being defined by a second speaker opening peripheral edge that lies entirely within the front cover area so that the second speaker opening is spaced apart from the front cover peripheral edge; and (b) a second audio speaker assembly mounted within the display assembly housing volume, the second audio speaker assembly being mounted within the display assembly housing volume so that a sound output area of the second audio speaker assembly aligns with the second speaker opening in the front cover.

18. The gaming machine of claim 17 wherein:

(a) the first audio speaker assembly includes an elongated first speaker enclosure located within the display assembly housing volume so as to extend along an edge of the display device area; and (b) the second audio speaker assembly includes an elongated second speaker enclosure located within the display assembly housing volume so as to extend along an edge of the display device area.

19. The gaming machine of claim 18 further including an opaque covering surrounding both the first speaker opening and the second speaker opening and covering an area of the front cover defined by an area of the elongated first speaker enclosure and an area of the elongated second speaker enclosure.

20. The gaming machine of claim 19 wherein the longitudinal axis of the elongated first speaker enclosure aligns with the longitudinal axis of the elongated second speaker enclosure.

* * * * *